United States Patent
Chambers

(10) Patent No.: US 7,636,497 B1
(45) Date of Patent: Dec. 22, 2009

(54) VIDEO ROTATION IN A MEDIA ACCELERATION ENGINE

(75) Inventor: Brent Chambers, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 603 days.

(21) Appl. No.: 11/318,997

(22) Filed: Dec. 27, 2005

(51) Int. Cl.
*G06K 9/32* (2006.01)
*G06K 9/36* (2006.01)

(52) U.S. Cl. .................. 382/277; 382/294; 382/296

(58) Field of Classification Search .............. 382/164, 382/173, 202, 224, 225, 232, 243, 276, 277, 382/294–296, 298, 300; 348/580, E5.055; 358/1.9, 451
See application file for complete search history.

(56) References Cited

U.S. PATENT DOCUMENTS

| | | | |
|---|---|---|---|
| 4,631,750 A * | 12/1986 | Gabriel et al. ............... | 382/277 |
| 5,097,518 A * | 3/1992 | Scott et al. ................... | 382/298 |
| 5,546,479 A * | 8/1996 | Kawanaka et al. ........... | 382/290 |
| 5,872,866 A | 2/1999 | Strongin et al. | |
| 5,903,313 A | 5/1999 | Tucker et al. | |
| 5,923,782 A * | 7/1999 | Chhabra et al. ............. | 382/202 |
| 5,974,197 A | 10/1999 | Lee et al. | |
| 6,075,918 A | 6/2000 | Strongin et al. | |
| 6,259,734 B1 | 7/2001 | Boon | |
| 6,314,209 B1 * | 11/2001 | Kweon et al. ................ | 382/243 |
| 6,348,925 B1 | 2/2002 | Potu | |
| 6,360,024 B1 | 3/2002 | Tan et al. | |
| 6,441,754 B1 | 8/2002 | Wang et al. | |
| 6,614,930 B1 * | 9/2003 | Agnihotri et al. ........... | 382/176 |
| 6,859,558 B2 | 2/2005 | Hong | |
| 6,859,561 B2 * | 2/2005 | Mitchell et al. ............. | 382/245 |
| 7,006,112 B2 | 2/2006 | Chia et al. | |
| 7,162,093 B2 | 1/2007 | Regunathan et al. | |
| 2002/0071599 A1 * | 6/2002 | Herget et al. ................ | 382/131 |
| 2003/0138150 A1 | 7/2003 | Srinivasan | |
| 2003/0158987 A1 | 8/2003 | MacInnis et al. | |
| 2003/0206664 A1 | 11/2003 | Gomila et al. | |
| 2004/0062307 A1 | 4/2004 | Hallapuro et al. | |

(Continued)

FOREIGN PATENT DOCUMENTS

EP  1 351 513  10/2003

OTHER PUBLICATIONS

International Search Report and Written Opinion of the International Searching Authority, PCT/US2006/001599, mailed May 31, 2006.

(Continued)

*Primary Examiner*—Amir Alavi
(74) *Attorney, Agent, or Firm*—Hamilton & Terrile, LLP; Gary W. Hamilton

(57) ABSTRACT

The present invention provides a method and apparatus for enhancing the performance of video display devices by improving the utilization of memory resources used to process video data. In the system of the present invention, a display is configured to generate a visual image as a plurality of horizontal rows of pixels. In the present invention, the source data frame for said image is divided into row segments comprising a predetermined number of pixels from the entire horizontal row. A plurality of columns are constructed using individual pixel segments from the horizontal rows. The columns are further divided into a plurality of row segment blocks that are rotated and stored in destination memory to generate a rotated visual image.

20 Claims, 12 Drawing Sheets

U.S. PATENT DOCUMENTS

| | | |
|---|---|---|
| 2004/0213345 A1 | 10/2004 | Holcomb et al. |
| 2004/0218671 A1 | 11/2004 | Haraguchi et al. |
| 2005/0013494 A1 | 1/2005 | Srinivasan et al. |
| 2005/0031216 A1 | 2/2005 | Kondo et al. |
| 2005/0047666 A1 | 3/2005 | Mitchell et al. |
| 2005/0259688 A1 | 11/2005 | Gordon |
| 2005/0259887 A1 | 11/2005 | Hellman |
| 2005/0281339 A1 | 12/2005 | Song |
| 2006/0165181 A1 | 7/2006 | Kwan et al. |

OTHER PUBLICATIONS

Bin Sheng et al., "A platform-based architecture of loop filter for AVS," Signal Processing 2004, Proceedings, ICSP '04, 2004 7th International Conference on Beijing, China Aug. 31-Sep. 4, 2004, Piscataway NJ, IEEE, Aug. 31, 2004, pp. 571-574.

Bin Sheng et al., "An implemented architecture of deblocking filter for H.264/AVC," Image Processing, 2004, ICIP '04, 2004 International Conference on Singapore , Oct. 24-27, 2004, Piscataway, NJ, IEEE vol. 1, Oct. 24, 2004, 665-668.

Lee Y-L et al., "Loop filtering and post-filtering for low-bit-rates moving picture coding," Signal Processing, Image Communication, Elsevier Science Publishers, Amsterdam, NL, vol. 16, No. 9, Jun. 2001, pp. 871-890.

Srinivasan S. et al., "Windows Media Video 9: Overview and applications," Signal Processing, Image Communication, Elsevier Science Publishers, Amsterdam, NL, vol. 19, No. 9, Oct. 2004, pp. 851-875.

V. Venkatraman et al., "Architecture for De-Blocking Filter in H.264," Picture Coding Symposium (PCS) San Francisco, 2004, 5 pages.

X. Sun et al., "In-Loop Deblocking Filter for Block-Based Video Coding," International Conference on Signal Processing, vol. 1, pp. 33-36 (2002) http://research.microsoft.com/asia/dload_files/group/imedia/2002p/deblocking_icsp_02.pdf, 4 pages.

Translation of Official Communication for German Application No. 11 2006 000 270.8-55, dated Apr. 29, 2009.

International Search Report and Written Opinion of the International Searching Authority, PCT/US2006/001598, mailed May 31, 2006.

Official Communication for German Patent Application No. 11 2006 000 271.6, dated May 8, 2009.

* cited by examiner

0 Degrees

| $P_{00}$ | $P_{01}$ | $P_{02}$ | $P_{03}$ | $\bullet\bullet\bullet$ | $P_{0n}$ |
|---|---|---|---|---|---|
| $P_{10}$ | $P_{11}$ | $P_{12}$ | $P_{13}$ | $\bullet\bullet\bullet$ | $P_{1n}$ |
| $P_{20}$ | $P_{21}$ | $P_{22}$ | $P_{23}$ | $\bullet\bullet\bullet$ | $P_{2n}$ |
| $P_{30}$ | $P_{31}$ | $P_{32}$ | $P_{33}$ | $\bullet\bullet\bullet$ | $P_{3n}$ |
| $\vdots$ | $\vdots$ | $\vdots$ | $\vdots$ | $\vdots$ | $\vdots$ |
| $P_{n0}$ | $P_{n1}$ | $P_{n2}$ | $P_{n3}$ | $\bullet\bullet\bullet$ | $P_{nn}$ |

*Figure 7a*

90 Degrees

| $P_{n0}$ | $\bullet\bullet\bullet$ | $P_{30}$ | $P_{20}$ | $P_{10}$ | $P_{00}$ |
|---|---|---|---|---|---|
| $P_{n1}$ | $\bullet\bullet\bullet$ | $P_{31}$ | $P_{21}$ | $P_{11}$ | $P_{01}$ |
| $P_{n2}$ | $\bullet\bullet\bullet$ | $P_{32}$ | $P_{22}$ | $P_{12}$ | $P_{02}$ |
| $P_{n3}$ | $\bullet\bullet\bullet$ | $P_{33}$ | $P_{23}$ | $P_{13}$ | $P_{03}$ |
| $\vdots$ | $\bullet\bullet\bullet$ | $\vdots$ | $\vdots$ | $\vdots$ | $\vdots$ |
| $P_{nn}$ | $\bullet\bullet\bullet$ | $P_{3n}$ | $P_{2n}$ | $P_{1n}$ | $P_{0n}$ |

*Figure 7b*

180 Degrees

| $P_{nn}$ | $\bullet\bullet\bullet$ | $P_{n3}$ | $P_{n2}$ | $P_{n1}$ | $P_{n0}$ |
|---|---|---|---|---|---|
| $\vdots$ | $\vdots$ | $\vdots$ | $\vdots$ | $\vdots$ | $\vdots$ |
| $P_{3n}$ | $\bullet\bullet\bullet$ | $P_{33}$ | $P_{32}$ | $P_{31}$ | $P_{30}$ |
| $P_{2n}$ | $\bullet\bullet\bullet$ | $P_{23}$ | $P_{22}$ | $P_{21}$ | $P_{20}$ |
| $P_{1n}$ | $\bullet\bullet\bullet$ | $P_{13}$ | $P_{12}$ | $P_{11}$ | $P_{10}$ |
| $P_{0n}$ | $\bullet\bullet\bullet$ | $P_{03}$ | $P_{02}$ | $P_{01}$ | $P_{00}$ |

*Figure 7c*

270 Degrees

| $P_{0n}$ | $P_{1n}$ | $P_{2n}$ | $P_{3n}$ | $\bullet\bullet\bullet$ | $P_{nn}$ |
|---|---|---|---|---|---|
| $\vdots$ | $\vdots$ | $\vdots$ | $\vdots$ | $\bullet\bullet\bullet$ | $\vdots$ |
| $P_{03}$ | $P_{13}$ | $P_{23}$ | $P_{33}$ | $\bullet\bullet\bullet$ | $P_{n3}$ |
| $P_{02}$ | $P_{12}$ | $P_{22}$ | $P_{32}$ | $\bullet\bullet\bullet$ | $P_{n2}$ |
| $P_{01}$ | $P_{11}$ | $P_{21}$ | $P_{31}$ | $\bullet\bullet\bullet$ | $P_{n1}$ |
| $P_{00}$ | $P_{10}$ | $P_{20}$ | $P_{30}$ | $\bullet\bullet\bullet$ | $P_{n0}$ |

*Figure 7d*

0 Degrees

| $P_{k0}$ | $P_{k1}$ | $P_{k2}$ | $P_{k3}$ | ••• | $P_{kn}$ |
|---|---|---|---|---|---|
| $P_{(k+1)0}$ | $P_{(k+1)1}$ | $P_{(k+1)2}$ | $P_{(k+1)3}$ | ••• | $P_{(k+1)n}$ |
| $P_{(k+2)0}$ | $P_{(k+2)1}$ | $P_{(k+2)2}$ | $P_{(k+2)3}$ | ••• | $P_{(k+2)n}$ |
| $P_{(k+3)0}$ | $P_{(k+3)1}$ | $P_{(k+3)2}$ | $P_{(k+3)3}$ | ••• | $P_{(k+3)n}$ |
| ⋮ | ⋮ | ⋮ | ⋮ | ⋮ | ⋮ |
| $P_{(k+n)0}$ | $P_{(k+n)1}$ | $P_{(k+n)2}$ | $P_{(k+n)3}$ | ••• | $P_{(k+n)n}$ |

Figure 7e

90 Degrees

| $P_{(k+n)0}$ | ••• | $P_{(k+3)0}$ | $P_{(k+2)0}$ | $P_{(k+1)0}$ | $P_{k0}$ |
|---|---|---|---|---|---|
| $P_{(k+n)1}$ | ••• | $P_{(k+3)1}$ | $P_{(k+2)1}$ | $P_{(k+1)1}$ | $P_{k1}$ |
| $P_{(k+n)2}$ | ••• | $P_{(k+3)2}$ | $P_{(k+2)2}$ | $P_{(k+1)2}$ | $P_{k2}$ |
| $P_{(k+n)3}$ | ••• | $P_{(k+3)3}$ | $P_{(k+2)3}$ | $P_{(k+1)3}$ | $P_{k3}$ |
| ⋮ | ••• | ⋮ | ⋮ | ⋮ | ⋮ |
| $P_{(k+n)n}$ | ••• | $P_{(k+3)n}$ | $P_{(k+2)n}$ | $P_{(k+1)n}$ | $P_{kn}$ |

Figure 7f

180 Degrees

| $P_{(k+n)n}$ | ••• | $P_{(k+n)3}$ | $P_{(k+n)2}$ | $P_{(k+n)1}$ | $P_{(k+n)0}$ |
|---|---|---|---|---|---|
| ⋮ | ⋮ | ⋮ | ⋮ | ⋮ | ⋮ |
| $P_{(k+3)n}$ | ••• | $P_{(k+3)3}$ | $P_{(k+3)2}$ | $P_{(k+3)1}$ | $P_{(k+3)0}$ |
| $P_{(k+2)n}$ | ••• | $P_{(k+2)3}$ | $P_{(k+2)2}$ | $P_{(k+2)1}$ | $P_{(k+2)0}$ |
| $P_{(k+1)n}$ | ••• | $P_{(k+1)3}$ | $P_{(k+1)2}$ | $P_{(k+1)1}$ | $P_{(k+1)0}$ |
| $P_{kn}$ | ••• | $P_{k3}$ | $P_{k2}$ | $P_{k1}$ | $P_{k0}$ |

Figure 7g

270 Degrees

| $P_{kn}$ | $P_{(k+1)n}$ | $P_{(k+2)n}$ | $P_{(k+3)n}$ | ••• | $P_{(k+n)n}$ |
|---|---|---|---|---|---|
| ⋮ | ⋮ | ⋮ | ⋮ | ••• | ⋮ |
| $P_{k3}$ | $P_{(k+1)3}$ | $P_{(k+2)3}$ | $P_{(k+3)3}$ | ••• | $P_{(k+n)3}$ |
| $P_{k2}$ | $P_{(k+1)2}$ | $P_{(k+2)2}$ | $P_{(k+3)2}$ | ••• | $P_{(k+n)2}$ |
| $P_{k1}$ | $P_{(k+1)1}$ | $P_{(k+2)1}$ | $P_{(k+3)1}$ | ••• | $P_{(k+n)1}$ |
| $P_{k0}$ | $P_{(k+1)0}$ | $P_{(k+2)0}$ | $P_{(k+3)0}$ | ••• | $P_{(k+n)0}$ |

Figure 7h

VIDEO ROTATION IN A MEDIA ACCELERATION ENGINE

BACKGROUND OF THE INVENTION

1. Field of the Invention

The present invention relates to video processing technology. In one aspect, the present invention relates to the display of digital video information in multiple rotated formats.

2. Description of the Related Art

Because video information requires a large amount of storage space, video information is generally compressed. Accordingly, to display compressed video information which is stored, for example on a CD-ROM or DVD, the compressed video information must be decompressed to provide decompressed video information. The decompressed video information is then provided in a bit stream to a display. The decompressed bit stream of video information is typically stored as a bit map in memory locations corresponding to pixel locations on a display. The video information required to present a single screen of information on a display is called a frame. A goal of many video systems is to quickly and efficiently decode compressed video information so as to provide motion video by displaying a sequence of frames.

Standardization of recording media, devices and various aspects of data handling, such as video compression, is highly desirable for continued growth of this technology and its applications. A number of (de)compression standards have been developed or are under development for compressing and decompressing video information, such as the Moving Pictures Expert Group (MPEG) standards for video encoding and decoding (e.g., MPEG-1, MPEG-2, MPEG-3, MPEG-4, MPEG-7, MPEG-21) or the Windows Media Video compression standards (e.g., WMV9). Each of the MPEG and WMV standards are hereby incorporated by reference in its entirety as if fully set forth herein.

In recent years, there has been a significant increase in the number of portable devices that are used to display video data using one of the standards discussed hereinabove. Many applications for the display of visual images require the ability to rotate the image. Prior art systems for rotating video images require that an entire frame of the video image be stored in a plurality of line buffers, followed by processing of the data in the line buffers to generate a rotated image.

The data processing components used in portable video devices generally present significant design constraints relating to processing capability and power management. In addition to these factors, data processing components used to process video signals present significant challenges with regard to memory management. Prior techniques discussed above for rotating a video image require large video storage buffers that occupy significant surface area on the data processing integrated circuits. It is apparent, therefore, that there is a need for an improved method and apparatus for processing video images that maximizes the use of memory resources, while decreasing the associated integrated circuit surface area devoted to video storage buffers.

SUMMARY OF THE INVENTION

The present invention provides a method and apparatus for enhancing the performance of video display devices by improving the utilization of memory resources used to process video data. In the system of the present invention, a display is configured to generate a visual image as a plurality of horizontal rows of pixels. In the present invention, the source data frame for said image is divided into row segments comprising a predetermined number of pixels from the entire horizontal row. A plurality of columns are constructed using individual pixel segments from the horizontal rows. The columns are further divided into a plurality of row segment blocks that are rotated and stored in destination memory to generate a rotated visual image.

The objects, advantages and other novel features of the present invention will be apparent to those skilled in the art from the following detailed description when read in conjunction with the appended claims and accompanying drawings.

BRIEF DESCRIPTION OF THE DRAWINGS

FIGS. 7a-d are pixel matrices that illustrate the relative pixel orientations for pixels in row segment blocks at the top of a column rotated by 0 degrees, 90 degrees, 180 degrees or 270 degrees, respectively.

FIGS. 7e-h are pixel matrices that illustrate the relative pixel orientations for pixels in row segment blocks in an interior portion of a column rotated by 90 degrees, 180 degrees or 270 degrees, respectively.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring the present invention. Such descriptions and representations are used by those skilled in the art to describe and convey the substance of their work to others skilled in the art. The present invention will now be described with reference to the drawings described below.

Figure 1:
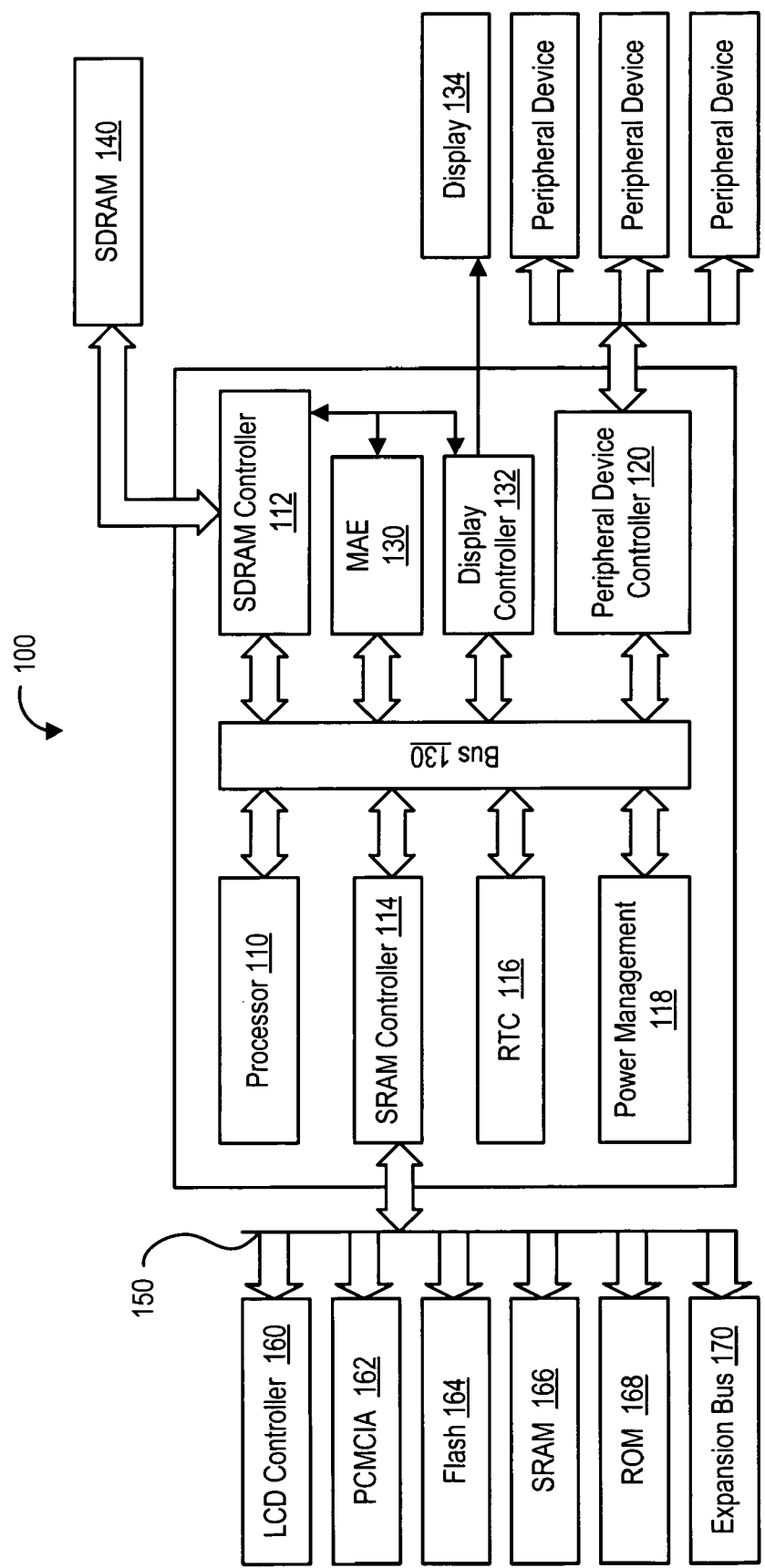
FIG. 1 shows a block diagram representation of a system for processing video information.

Referring to FIG. 1, system 100 is designed for use in mobile information appliances. System 100 includes a processor 110, a synchronous dynamic random access memory (SDRAM) controller 112, a static random access memory (SRAM) controller 114, a real time clock 116, a power management module 118, and a peripheral device control module 120, all interconnected via bus 130. The peripheral device control module 120 may be coupled to one or more peripheral devices such as an Ethernet media access control (MAC) controller, a universal serial bus (USB) device and host controller, a universal asynchronous receiver transmitter (UART) controller, an Infrared Data Association (IrDA) controller, an audio code '97 (AC'97) controller, and a secure digital (SD) controller. In various embodiments of the invention, system 100 can be implemented using a complete system on a chip (SOC) based on a MIPS32 instruction set.

System 100 also includes a media accelerator engine (MAE) 130 as well as an LCD controller 132. The media accelerator engine 130 and the display controller 132 are coupled to the SDRAM controller 112. The display controller 132 may also be coupled to a display device 134.

SDRAM controller 112 is coupled to SDRAM 140. SRAM controller 114 is coupled to a static bus 150. The static bus 150 is a general purpose bus which includes a 32-bit address path, a 32-bit data bus, a plurality of control signal paths, including a plurality of general purpose I/O signal paths. Some or all of the control signal paths and the general purpose I/O signal paths may be used depending on the type of device with which the SDRAM controller 114 is communicating. Among other possible uses, the SDRAM 140 can be used as destination video memory for storing video data in accordance with various embodiments of the invention as discussed hereinbelow.

Static bus 150 is also coupled to one or more static bus devices such as, e.g., an LCD controller 160, a personal computer memory card international association (PCMCIA) device 162, a flash memory device 164, SRAM 166, read only memory (ROM) 168, and an expansion bus 170. Static bus 150 is also coupled to a DMA acknowledge control circuit 180. The SRAM controller 114 functions as a general purpose bus controller and may communicate with any one of a plurality of static bus devices. For example, when SRAM controller 114 is communicating with the SRAM 166, then SRAM controller 114 functions as an SRAM controller. When SRAM controller 114 is communicating with a PCMCIA device 162, then the SRAM controller 114 functions as a PCMCIA controller. The static bus 150 may interface with Integrated Drive Electronics (IDE) hard drives via a modified PCMCIA interface. Such an interface eliminates the need for an external disk drive controller.

Figure 2:
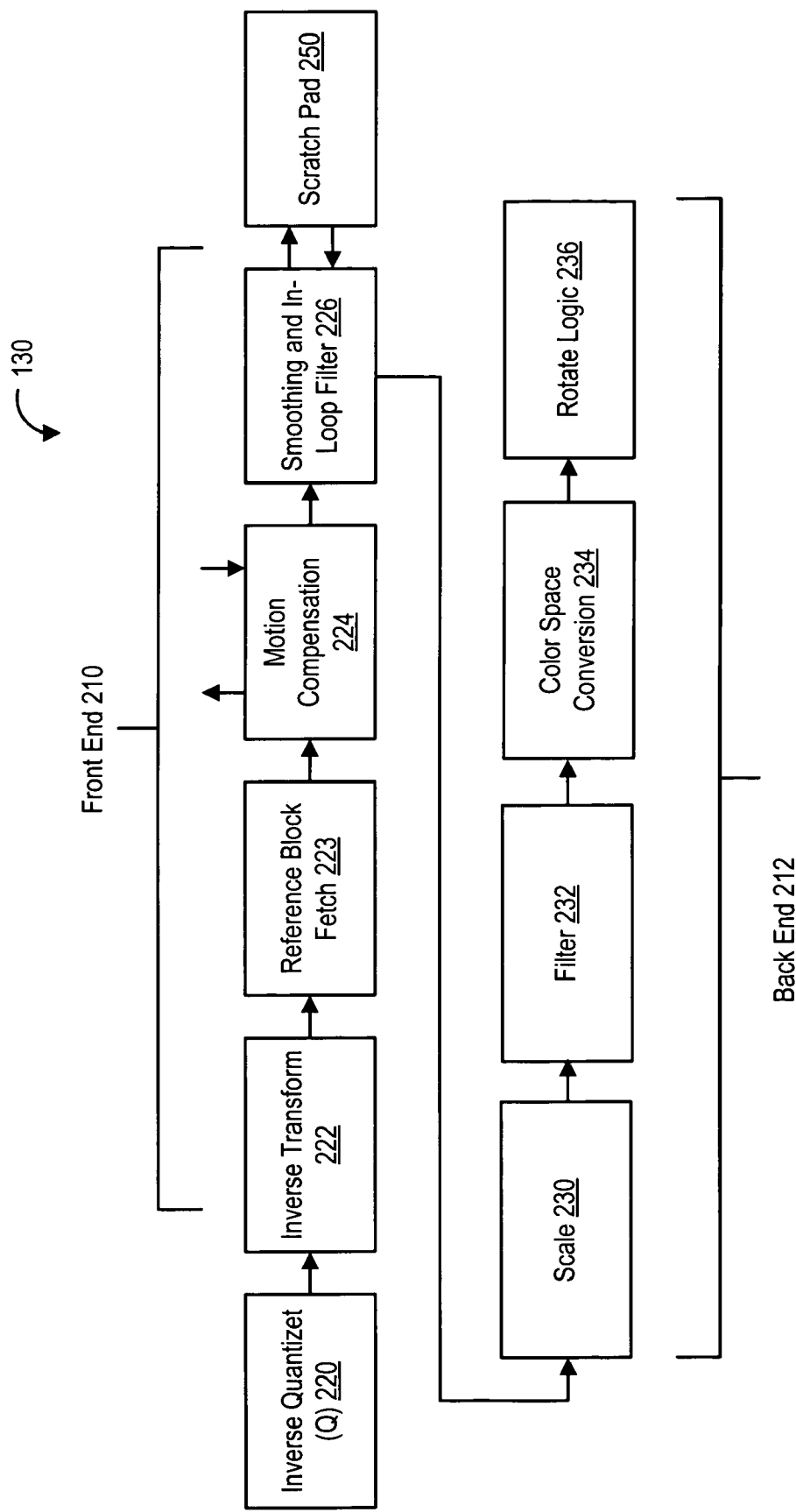
FIG. 2 shows a block diagram representation of an exemplary video decompression system constructed in accordance with the present invention.

Referring to FIG. 2, a schematic block diagram of a media acceleration engine 130 is shown. The media acceleration engine 130 includes a front end 210 and a back end 212. The front end 210 includes an inverse quantize module 220, an inverse transform module 222, a reference block fetch module 223, a motion compensation module 224 and a smoothing and in-loop filter module 226. The back end 212 includes a scaling module 230, a filter module 232, and color space conversion module 234. The media acceleration engine 130 also includes a scratch pad 250 with which the smoothing and in-loop filter module 226 interacts.

The inverse quantize module 220 provides an inverse quantization (IQ) function. The inverse transform module 222 provides an inverse discrete cosine transform (IDCT) function. The motion compensation module 224 provides interframe, predicted and bidirectional motion compensation function. The motion compensation function includes support for 1, 2 and 4 motion vectors, support for field prediction and ful pel, half pel and quarter pel motion compensation. The smoothing and in-loop filter module 226 provides WMV9 an overlap smoothing and an in-loop filter function.

The color space conversion module 234 provides scaler support for various input and output modes as well as programmable coefficient data. The scaling module 230 provides a plurality of scaling functions including a reduced bandwidth operating mode. The filter module 232 enables independent horizontal and vertical filtering.

Figure 3A:
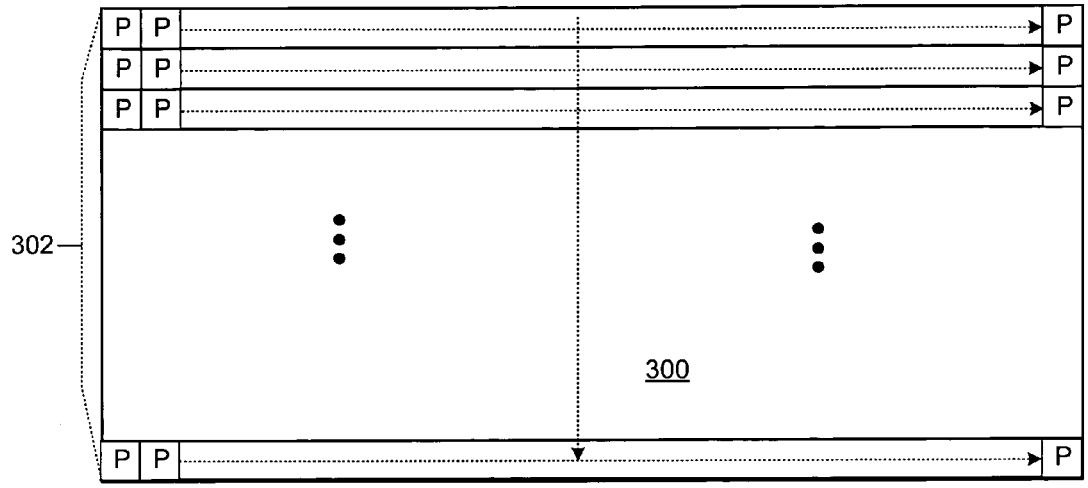
FIG. 3a is an illustration of a video image comprising a plurality of rows of pixels.

FIG. 3a is an illustration of a video frame 300 for displaying visual information on the display 134 shown in FIG. 1. The visual image is formed by a plurality of pixels P aligned in rows 302. As will be appreciated by those of skill in the art, the visual image generated by the data frame 300 is formed by reading the pixels P in the rows of the video frame. A visual image is formed by illuminating the pixels in the rows 302 using a raster scan procedure beginning in the top row from left-to-right, then proceeding to the lower rows until all pixels have been illuminated. The data for illuminating the pixels P is read from video memory in a logical pattern corresponding to the raster scan sequence used to illuminate the pixels.

Scaling of the image in FIG. 3a is typically accomplished by storing each of the individual rows 302 and performing interpolation calculations to change the number of pixels in each individual row. Scaling can be used to increase or decrease the number of pixels. Prior art scaling techniques require that the entire group of pixels in each row to be stored in a line buffer to perform the desired scaling operation. As discussed hereinabove, buffers that are large enough to store all of the pixels in the individual rows are generally undesirable in portable video data processing systems.

Figure 3B:
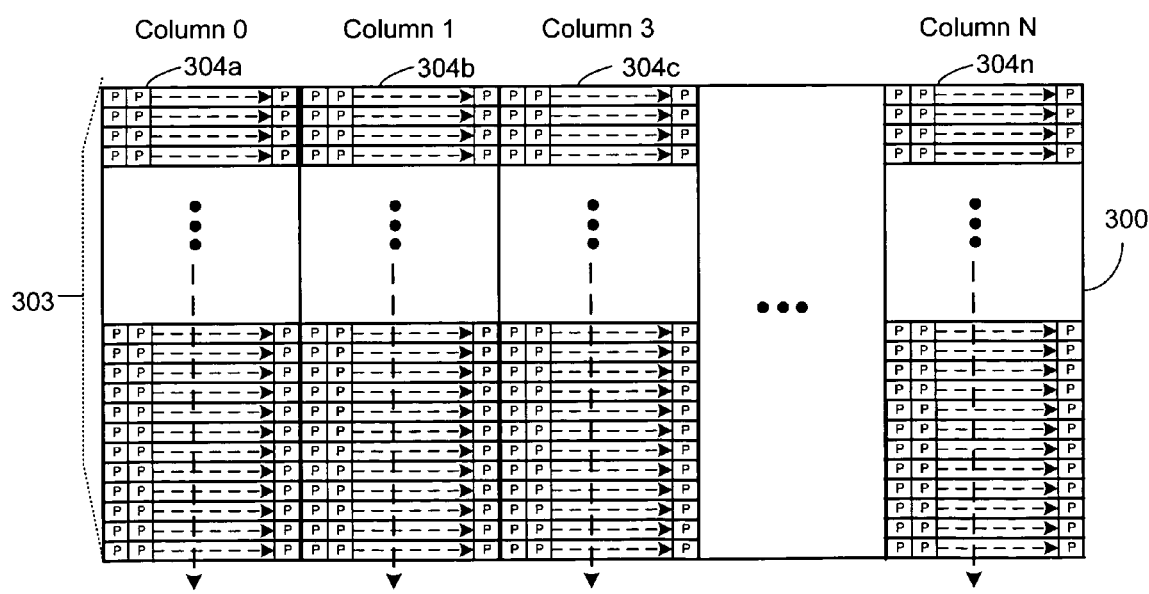
FIG. 3b is an illustration plurality of columns of pixel row segments used to scale a video image in accordance with the present invention.

FIG. 3b is an illustration of an embodiment of the present invention for scaling video images by generating a plurality of row segments 303 comprising a predetermined number of the total pixels P in the individual rows 302 shown in FIG. 3a. The row segments 303 of pixels are grouped in columns 304a, 304b, . . . , 304n that can be processed efficiently to implement scaling of the video image using techniques described in greater detail hereinbelow.

Figure 4A:
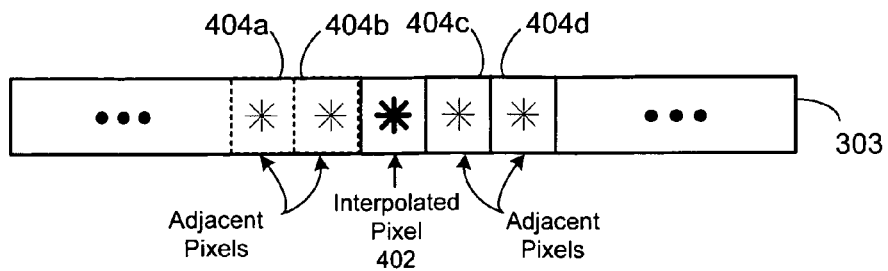
FIG. 4a is an illustration of pixel interpolation in a row segment of a column using pixels adjacent to the interpolated pixel.
Figure 4B:
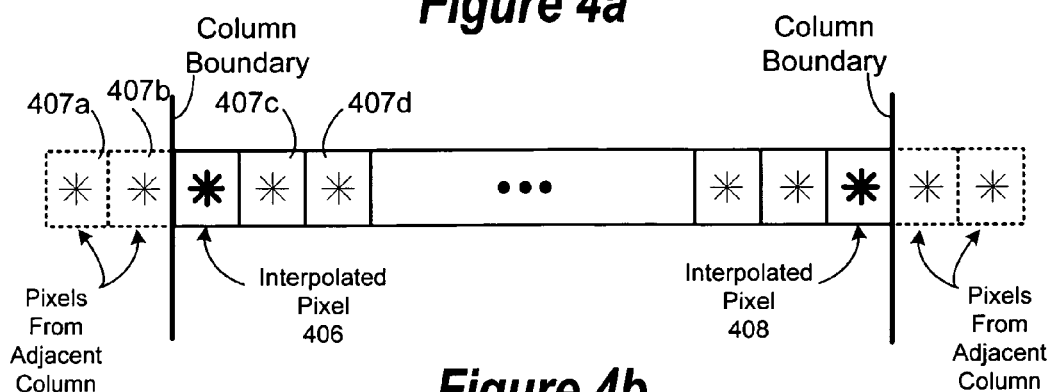
FIG. 4b is an illustration of pixel interpolation in a row segment of a column using pixels from the row segment and pixels from a row segment in adjacent columns.
Figure 4C:
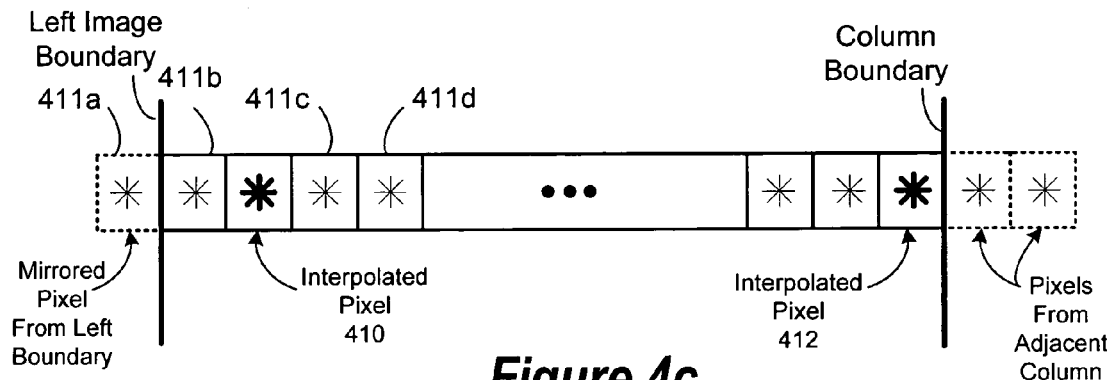
FIG. 4c is an illustration of pixel interpolation in a row segment of a column using pixels from an adjacent right column and a mirrored pixel.
Figure 4D:
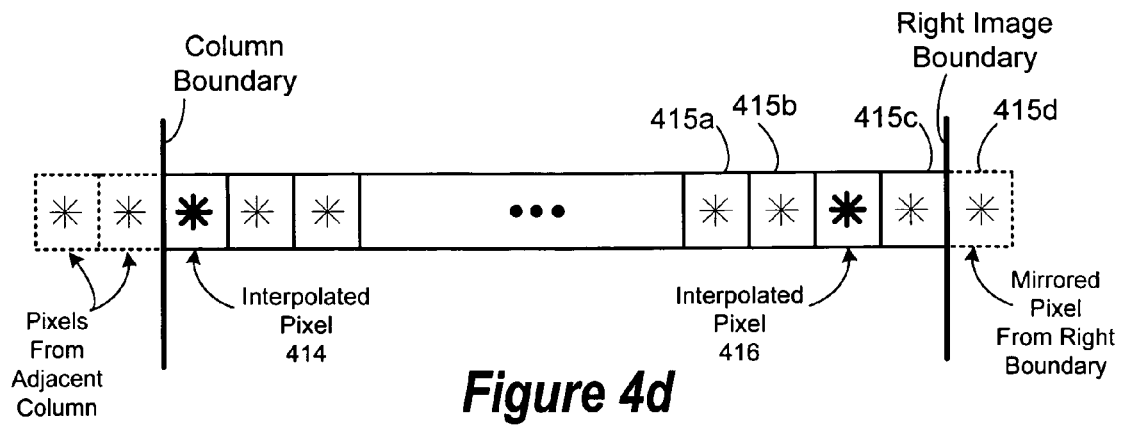
FIG. 4d is an illustration of pixel interpolation in a row segment of a column using pixels from an adjacent left column and a mirrored pixel.

FIGS. 4a-d illustrate various embodiments of the present invention for scaling a video image by interpolating pixels. Each of the interpolated pixels is obtained by using scaling logic to process information obtained from two pixels on each side of the interpolation point. FIG. 4a generally illustrates the generation of an interpolated pixel 402 within a row segment 303 in accordance with one embodiment of the invention. FIG. 4b illustrates the generation of interpolated pixels 406 and 408 for a row segment in a column that is between adjacent columns, but not on the boundary of the visual image. FIGS. 4c and 4d illustrate the generation of interpolated pixels for a row segment in a column having one side adjacent to the boundary of the visual image and the other side adjacent to another column.

Referring to FIG. 4a, the interpolated pixel 402 is obtained by using information received from two pixels on either side of the interpolation point. In the example illustrated in FIG. 4a, pixels 404a, 404b to the left and pixels 404c, 404d to the right are used to provide data for generating the interpolated pixel 402. In various embodiments of the invention discussed herein, the value for illumination of an interpolated pixel $P_i$, e.g. pixel 402 in FIG. 4a, is obtain by multiplying the value of the interpolation source pixels, e.g., 404a-d, by weighting coefficients according to the following formula:

$$P_i = A(P_{n-2}) + B(Pn-1) + C(Pn+1) + D(Pn+2) \quad [Eq1]$$

In the example illustrated in FIG. 4a, pixels 404a, 404b, 404c, and 404d correspond to pixels Pn−2, Pn−1, Pn+1 and Pn+2 in Eq1 above.

FIG. 4b illustrates the generation of interpolated pixels for a row segment in a column that is between adjacent columns, i.e., not on the boundary of the visual image. In this embodiment, interpolated pixels 406 and 408 are obtained by using information received from two pixels in the column and two pixels from adjacent columns. For example, interpolated pixel 406 is obtained by using data from pixels 407a and 407b from a row segment in an adjacent column and pixels 407c and 407d from within the row of the column where the interpolated pixel will be generated.

In FIG. 4c, interpolated pixel 410 is obtained by processing information received from two adjacent pixels 411c and 411d to the right of the interpolation point but within the column being processed. The two pixels to the left of interpolated pixel 410 comprise one pixel 407b that is within the column and one pixel 407a that is obtained by "mirroring" the actual pixel that is located within the column. Interpolated pixel 412 is obtained by processing information received from two pixels inside the column to the left of the interpolation point and two pixels in the adjacent column to the right of the interpolation point, as discussed above in connection with FIG. 4b.

In FIG. 4d, interpolated pixel 414 is obtained by processing information received from two pixels inside the column to the right of the interpolation point and two pixels in the adjacent column to the left of the interpolation point as discussed above in connection with FIG. 4b. Interpolated pixel 416 is obtained by processing information received from two adjacent pixels 415a, 415b to the left of the interpolation point that are within the column being processed. The two pixels to the right of interpolated pixel 412 comprise one pixel 415c that is within the column and one pixel 415d that is obtained by "mirroring" the actual pixel that is located within the column.

The present invention also provides for vertical scaling of pixels by using pixels in adjacent row segments within a column using the techniques discussed hereinabove for horizontal scaling by interpolating pixels within a row segment. For example, interpolation of a pixel for vertical scaling can be implemented by using pixels from two rows above and two rows below the desired location for the interpolated pixel. In addition, the mirroring techniques described hereinabove can be used to provide interpolation information for generating interpolated pixels for desired pixel locations near the vertical boundaries of the video frame.

Figure 5:
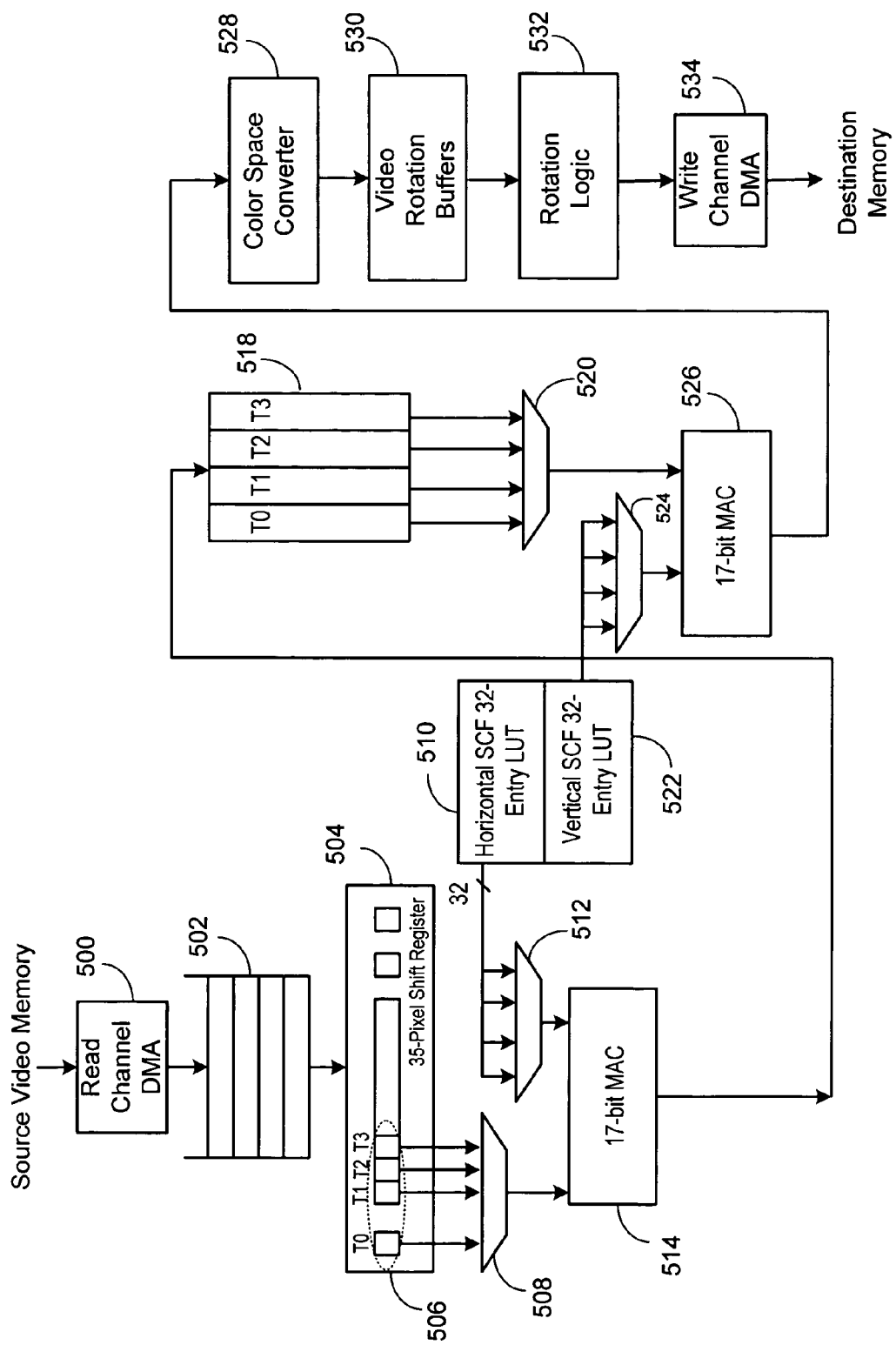
FIG. 5 is an illustration of data processing logic used to implement the method and apparatus of the present invention for scaling a video image.

FIG. 5 is an illustration of the processing logic used to scale the visual image by processing individual pixels in a column. Incoming row segments of pixels from the source video memory are processed by a read channel DMA 500 and received in buffer 502. The row segments are sequentially provided to a shift register 504 wherein a four tap filter is implemented using taps T0, T1, T2 and T3 to generate inputs to a multiplexer 508. In addition, a horizontal scaling filter look-up table 510 provides coefficients to a multiplexer 512. The outputs of the multiplexers 508 and 512 are provided as inputs to a multiply and accumulator (MAC) 514 which processes the pixels using the coefficients from the look-up table 512. The output of the MAC 514 is provided to a FIFO buffer 518 which generates a plurality of rows that can be used as input to multiplexer 520 for vertical scaling. A vertical scaling filter look-up table 522 provides vertical scaling coefficients to a multiplexer 524 which provides coefficient inputs to MAC 526. The MAC uses the coefficients from the multiplexer 524 and the vertical rows from the multiplexer 520 to generate vertically scaled row segments for the color space converter 528. The data stream from the color space converter 528 is provided a plurality of video rotation buffers 530 that store predefined blocks, discussed in greater detail hereinbelow, for processing by rotation logic 532 to generate rotated blocks of row segments for generating a rotated visual image. The blocks of row segments are written to the destination memory by write channel DMA 534 that is operable to translate the memory addresses of pixels in the rotated row segment blocks into predetermined addresses for storage in the destination memory.

Figure 6:
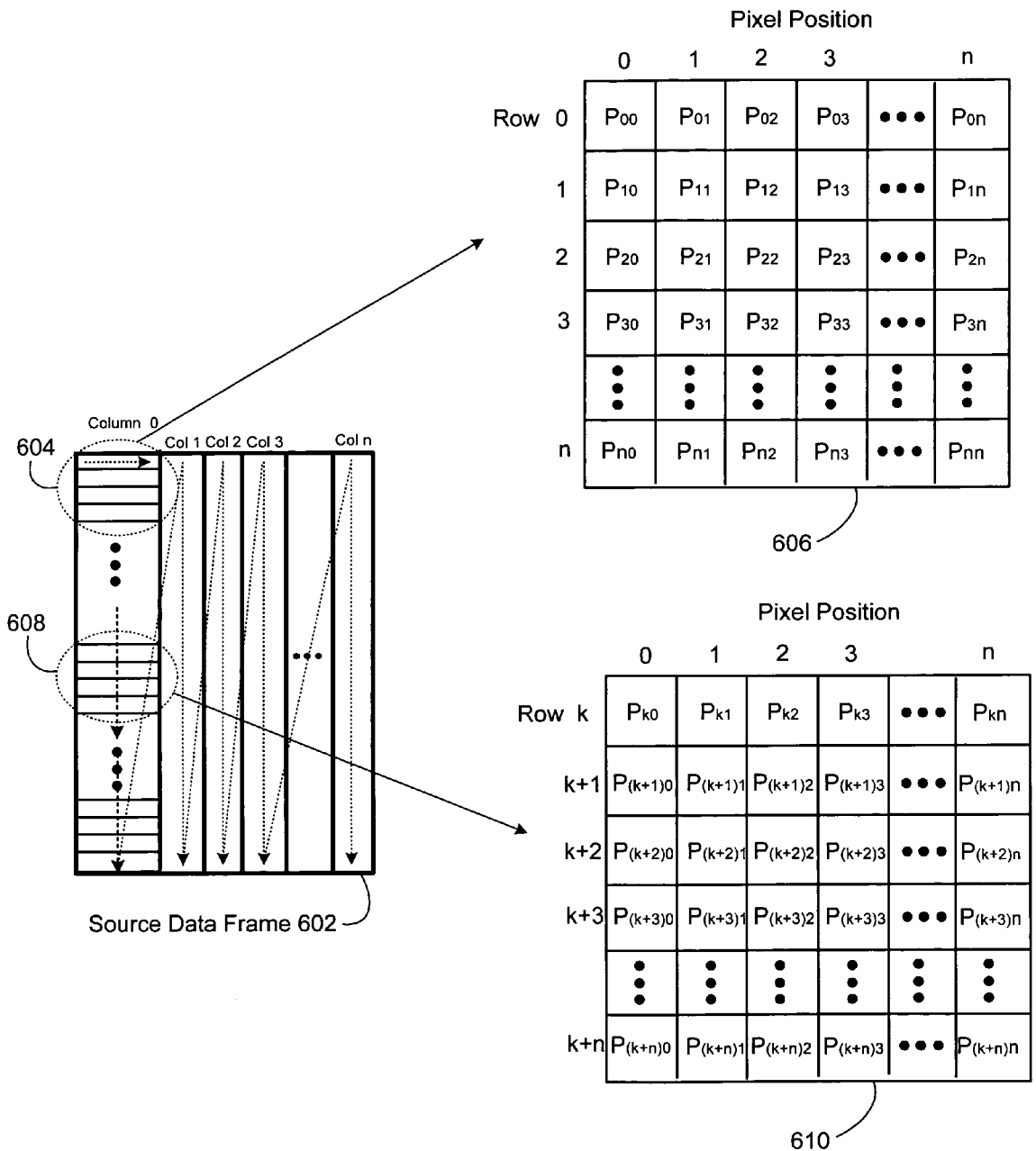
FIG. 6 is an illustration of blocks of row segments that are rotated as to generate a rotated version of a visual image.

FIG. 6 is an illustration of blocks of row segments that are rotated as discussed hereinbelow to generate a rotated version of a visual image displayed in a frame 606. The frame 606 is comprised of a plurality of columns 0-n, substantially similar to those discussed hereinabove in connection with FIG. 3b. The read sequence within a single column is the same as the sequence that would be used to read the pixels in any data frame of a visual image. The reading sequence begins in the top left corner in row 0, pixel position 0 and proceeds to the right until all of the pixels in the row segment have been read. In an embodiment of the invention, a row segment comprises 32 pixels. However, after scaling of pixels, it is possible for a row to comprise up to 128 pixels. After all of the pixels in a row segment have been read, processing proceeds to the next row in the column, e.g., row 1. After all of the pixels in each of the row segments have been read, processing proceeds to the next column, e.g., column 1, and the sequence is repeated. The sequence for reading the pixels in the row segments for each of the columns is illustrated generally in FIG. 6, by dashed lines.

In various embodiments of the present invention, rotation of a visual image is accomplished by rotating a plurality of blocks comprised of a predetermined number of pixel row segments within the various columns. In one embodiment of the invention, the blocks of rows segments are symmetrical, with the number of row segments equaling the number of pixels in a single row segment. For example, in one embodiment of the invention, an individual row segment comprises 32 pixels. In this embodiment of the invention, a block of row segments would comprise 32 rows. In other embodiments of the invention, scaling of the pixels can result in up to 128 pixels in each row segment. In this embodiment of the invention, the block of row segments would comprise 128 rows.

Details relating to the blocks of row segments can be understood by referring to blocks 604 and 608 illustrated in FIG. 6. Row segment block 604 is positioned in the uppermost position in column 0, with pixels beginning at row 0, pixel position 0. The individual pixel indices within the row segment block 606 are illustrated by matrix 606. In this embodiment, the row segment block is symmetrical with n rows and n columns. Row segment block 608 is representative of a block located at an interior position within a column. The starting address for a pixel in the upper left corner of block 608 is row k, pixel 0 and the block is symmetrical with n pixel positions and k+n rows. The individual pixel indices within the row segment block 608 are illustrated by matrix 610.

As discussed above, the visual image formed by the pixels in frame 602 can be rotated by associating predetermined row segments into a plurality of row segment blocks within the columns of the frame 602 and then rotating the individual row segment blocks. In various embodiments of the invention, the individual row segment blocks can be rotated in increments of 90 degrees to rotate the individual blocks by 90 degrees, 180 degrees or 270 degrees. The pixels in the rotated row segment blocks are then stored in predetermined locations in destination memory to provide a plurality of pixels that can be used to generate a rotated visual image.

FIGS. 7a-d are pixel matrices that illustrate the relative pixel orientations for pixels in row segment block 604 rotated by 0 degrees, 90 degrees, 180 degrees or 270 degrees, respectively. Likewise, FIGS. 7e-h are pixel matrices that illustrate the relative pixel orientations for pixels in row segment block 608 rotated by 90 degrees, 180 degrees or 270 degrees, respectively.

Figure 8A:
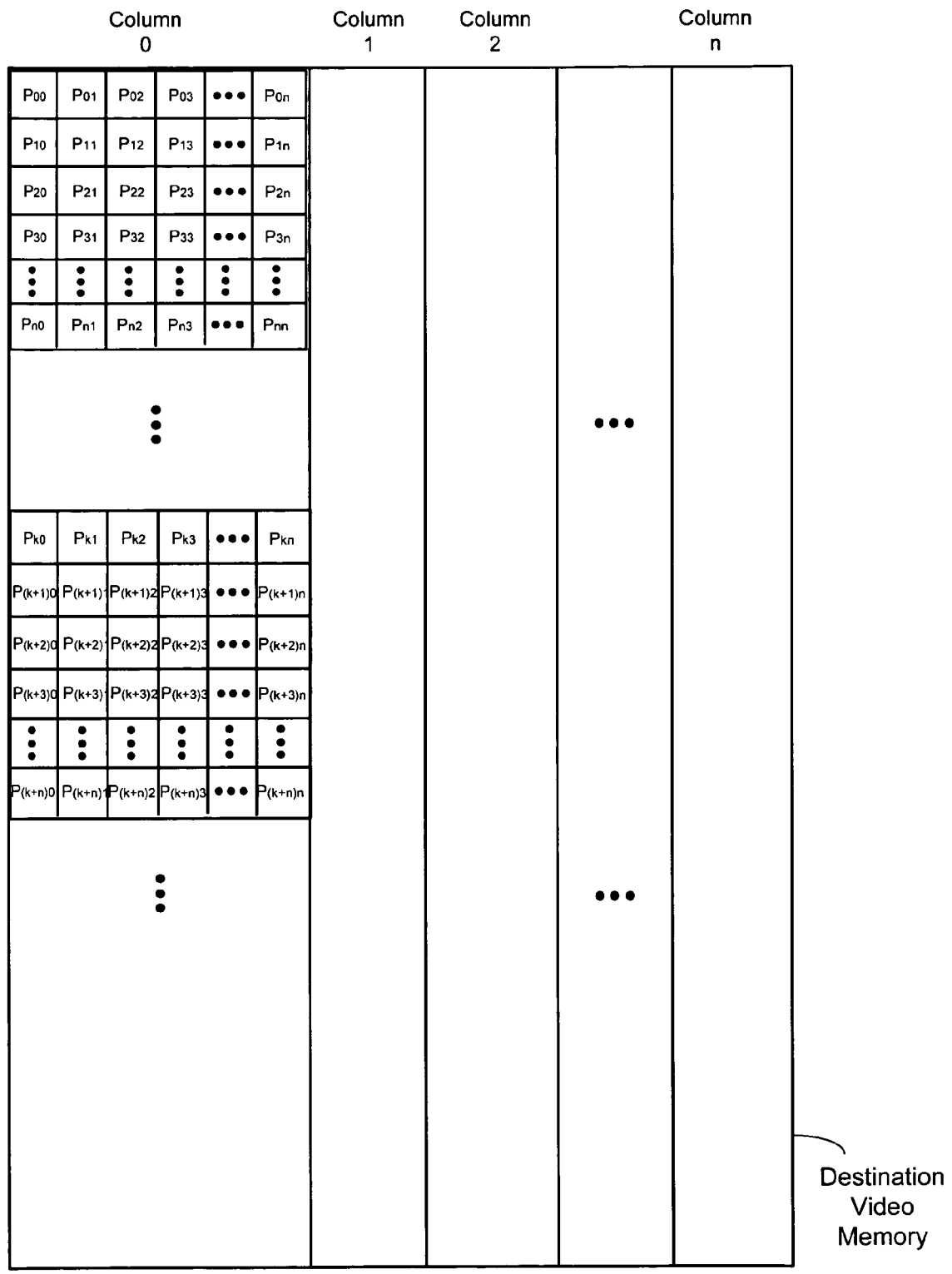
FIGS. 8a-d illustrate placement of the pixels in rotated row segment frames at predetermined address locations in destination video memory.
Figure 8B:
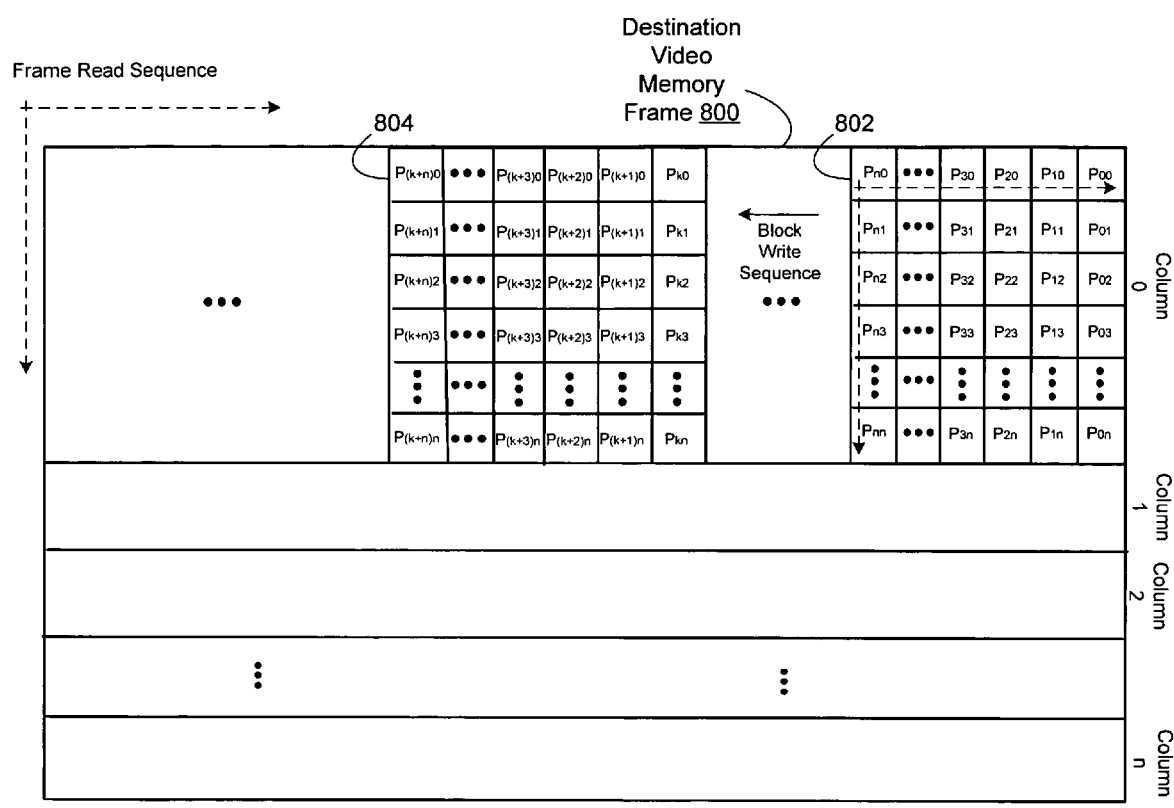
Figure 8C:
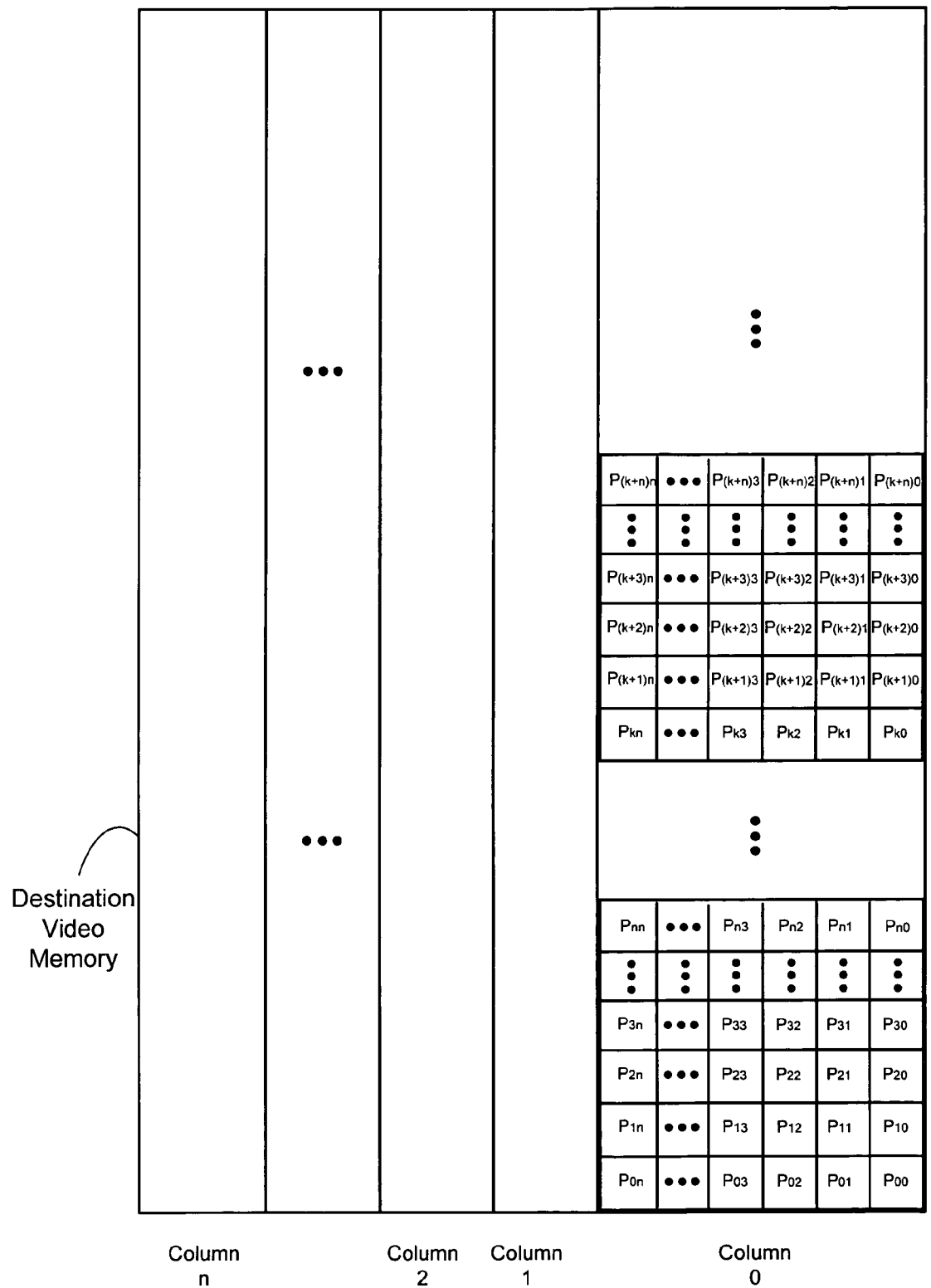
Figure 8D:
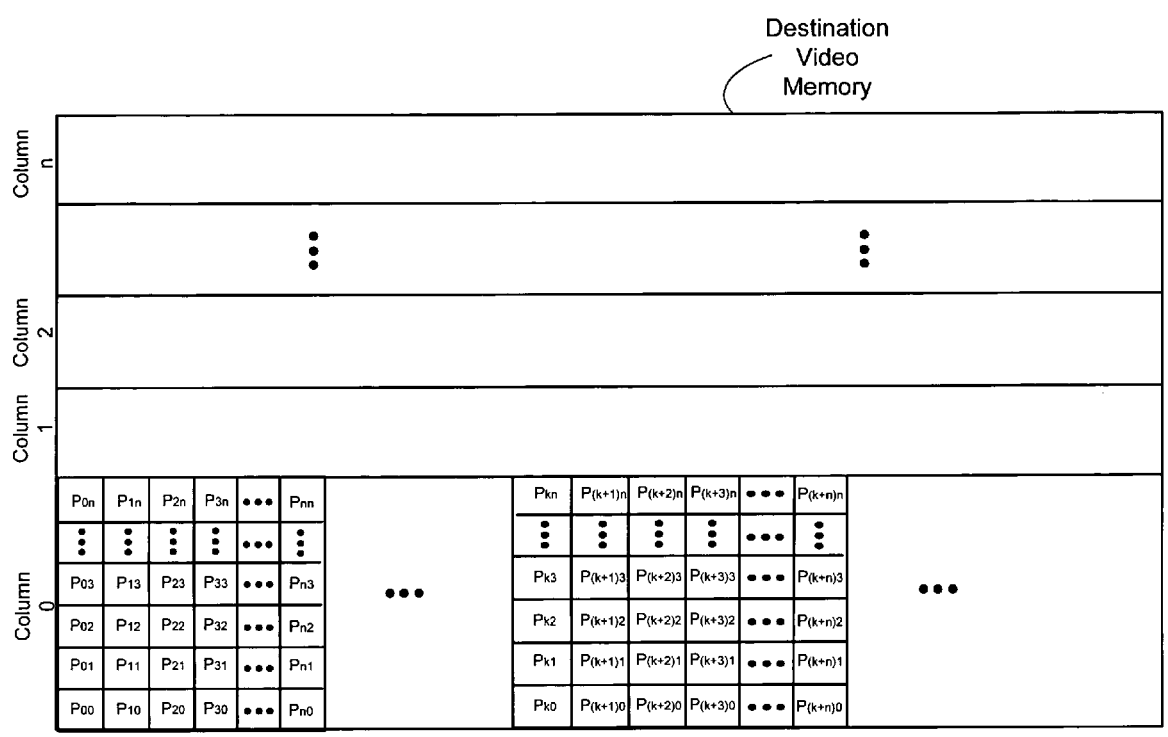

FIGS. 8a-d illustrate placement of the pixels in rotated row segment frame 604 and 608 stored in predetermined address locations in destination video memory. FIG. 8a is an illustration of a data frame in destination video memory wherein the pixels corresponding to row segment blocks 604 and 608 have not been rotated. The row segment blocks 604 and 608 are placed in predetermined memory addresses in the destination memory for subsequent generation of a visual image that has not been rotated. FIG. 8b is an illustration of a data frame in destination video memory wherein the pixels corresponding to row segment blocks 604 and 608 have been rotated by 90 degrees and placed at predetermined memory addresses in the destination memory for subsequent generation of a visual image that has been rotated by 90 degrees. FIG. 8c is an illustration of a data frame in destination video memory wherein the pixels corresponding to row segment blocks 604 and 608 have been rotated by 180 degrees and placed at predetermined memory addresses in the destination memory for subsequent generation of a visual image that has been rotated by 180 degrees. FIG. 8d is an illustration of a data frame in destination video memory wherein the pixels corresponding to row segment blocks 604 and 608 have been rotated by 270 degrees and placed at predetermined memory addresses in the destination memory for subsequent generation of a visual image that has been rotated by 270 degrees.

In each of the aforementioned frames of destination video memory, the rotated frame segment blocks are written into predetermined addresses in a standard sequence within the segment blocks. The frame of destination memory is populated with the rotated blocks, however, in the relative sequence that the individual blocks were read from the corresponding column in the pre-rotation orientation of the video frame. For example, referring to FIG. 8b, the row segment block 802 is written into the relative location in destination video memory frame 800 in the top right corner as shown. Within the designated relative memory location, the individual pixels of the row segments are written in the conventional left-to-right sequence with the rows being read from top-to-bottom within the block. The blocks for this orientation are written in a right-to-left sequence beginning with blocks comprising the original column 0 and proceeding downward to column n. This translation of data addresses is implemented by the rotation logic 523 and write channel DMA 534 using techniques understood by those of skill in the art. Once the destination video frame has been populated, the pixels are read in a standard raster sequence from left to right within individual rows, beginning at the top row and proceeding to the bottom row.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for scaling video data, comprising:
using a processor to perform the steps of:
receiving a plurality of pixels comprising a set of horizontal pixel rows for displaying a video image;
grouping predetermined sets of said plurality of pixels into row segments corresponding to portions of said horizontal pixel rows;
associating predetermined row segments to define columns of pixels corresponding to a portion of said video image;
selecting a predetermined plurality of rows to form a plurality of row segment blocks and
rotating said plurality of row segment blocks to generate a rotated video image.

2. The method of claim 1, wherein the number of rows of said row segment blocks is equal to the number of pixels in individual row segments of said columns.

3. The method of claim 2, wherein the row segments in said row segment blocks comprise interpolated pixels.

4. The method of claim 3, wherein pixels in said individual row segments are processed to provide horizontal scaling of said visual image.

5. The method of claim 4, wherein said horizontal scaling is implemented by processing said pixels in said row segments using a four tap filter.

6. The method of claim 3, wherein pixels in said individual row segments are processed to provide vertical scaling of said visual image.

7. The method of claim 6, wherein vertical scaling is implemented by processing said pixels in said row segments using a four tap filter.

8. The method of claim 3, wherein processing of said row columns to generate said scaled image comprises performing interpolation using pixels from within the row segment wherein said interpolated pixel is to be generated.

9. The method of claim 3, wherein processing of said row columns to generate said scaled image comprises performing interpolation using pixels from row segments in columns adjacent to the column of the row segment in which said interpolated pixel is to be generated.

10. The method of claim 3, wherein processing of said row columns to generate said scaled image comprises mirroring predetermined pixels in individual row segments and performing interpolation using said mirrored pixels.

11. A system for performing scaling of a video image, comprising:
video processing circuitry operable to generate a frame of video data comprising a set of horizontal pixel rows for displaying a video image;
scaling logic operable to:
group predetermined sets of said plurality of pixels into row segments corresponding to portions of said horizontal pixel rows;
associate predetermined row segments to define columns of pixels corresponding to a portion of said video image; and
select a predetermined plurality of rows to form a plurality of row segment blocks; and
video rotation logic operable to process said plurality of row segment blocks to generate a rotated video image.

12. The system of claim 11, wherein the number of rows of said row segment blocks is equal to the number of pixels in individual row segments of said columns.

13. The system of claim 12, wherein the row segments in said row segment blocks comprise interpolated pixels generated by scaling logic.

14. The system of claim 13, wherein pixels in said individual row segments are processed to provide horizontal scaling of said visual image.

15. The system of claim 14, wherein said horizontal scaling is implemented by processing said pixels in said row segments using a four tap filter.

16. The system of claim 13, wherein pixels in said individual row segments are processed to provide vertical scaling of said visual image.

17. The system of claim 16, wherein vertical scaling is implemented by processing said pixels in said row segments using a four tap filter.

18. The system of claim 13, wherein processing of said row columns to generate said scaled image comprises performing interpolation using pixels from within the row segment wherein said interpolated pixel is to be generated.

19. The system of claim 13, wherein processing of said row columns to generate said scaled image comprises performing interpolation using pixels from row segments in columns adjacent to the column of the row segment in which said interpolated pixel is to be generated.

20. The system of claim 13, wherein processing of said row columns to generate said scaled image comprises mirroring predetermined pixels in individual row segments and performing interpolation using said mirrored pixels.

* * * * *